May 26, 1931.  H. J. BURNISH  1,806,932
PIPE COUPLING THREAD PROTECTOR
Filed Sept. 12, 1927
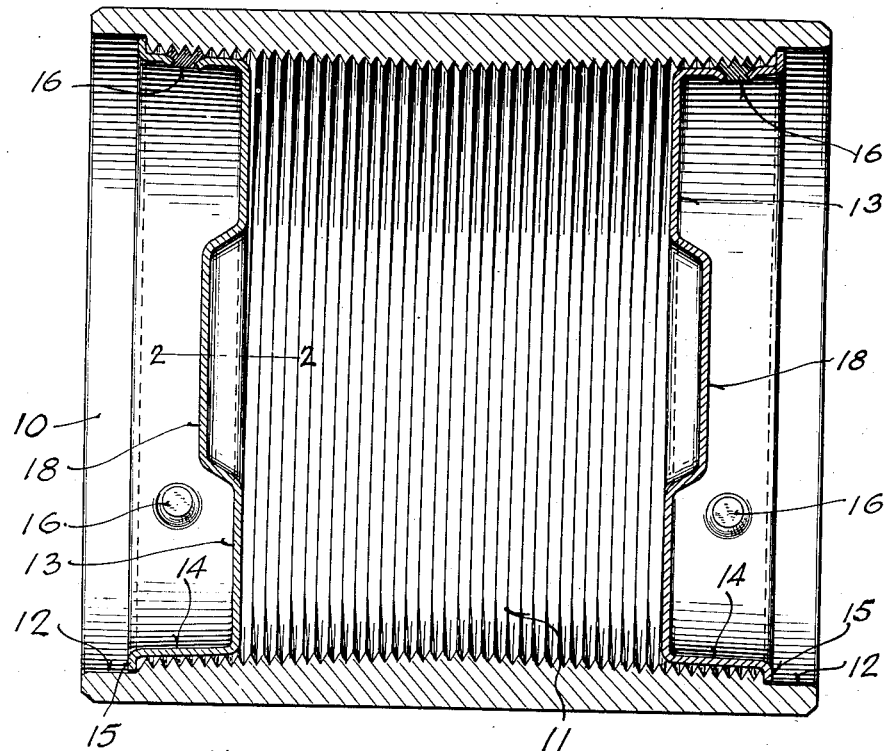
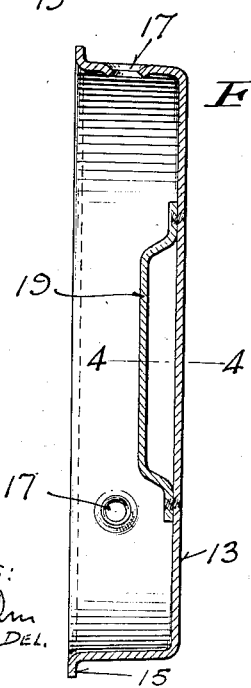
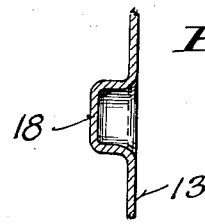
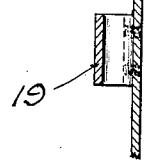
WITNESS:
Fred Palm
DEL.
INVENTOR.
HOWARD J. BURNISH
BY
Erwin, Wheeler & Woodard
ATTORNEYS.

Patented May 26, 1931

1,806,932

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

PIPE COUPLING THREAD PROTECTOR

Application filed September 12, 1927. Serial No. 219,021.

The present invention relates to thread protecting devices, particularly designed for application to pipe couplings of large diameter, such as are used in oil wells, and it resides in an improvement embodied in a simple construction which serves effectively to close the open ends of the coupling, and so completely shield the threads of the latter as to prevent access of moisture, dirt and other deleterious substances, such as would injure the threads of the coupling, if permitted to be brought into contact therewith.

The invention resides in a shell, struck from a sheet metal disc, and adapted to fit snugly by insertion into the open ends of the coupling, with the side walls of the shell lying approximately parallel to the threads at the ends of the coupling. In connection with the special form of thread protector devised by me, I employ a simple but effective means for securing the thread protector in position within the ends of the coupling, but at the same time such means permits the ready removal of the protector from the coupling, when occasion therefor arises.

In applying such securing means, I perforate the side walls of the shell at points spaced about its periphery, and after the shell has been inserted in place by merely slipping it into position in the open end of the coupling, I then drive soft metal plugs into the said perforations. The ends of these plugs, in passing through the perforations, are brought into engagement with the threads at the ends of the coupling and readily conform to the contour thereof, so as to form complemental threads upon the protecting shell, and permitting the latter to be removed from the coupling by simply unscrewing. On account of the ductile nature of the soft metal plugs, the threads of the coupling are not injured in the operation of applying and removing.

The bottom plate of the shell is provided with an upstanding rib or bar, which may be integral therewith, or formed as an attached part, affording convenient means for the application of a wrench to unscrew the thread protector and withdraw it from the coupling.

Having thus outlined the nature of my invention, I will now describe the specific construction of the same and point out the novelty residing therein in the appended claims.

In the accompanying drawings:

Figure 1 is an axial central section through a pipe coupling of the usual type, showing my improved thread protector as applied thereto.

Fig. 2 is a fragmentary view on the line 2—2, Fig. 1, on the transverse diameter, showing the form of the integral rib or bar on the bottom of the thread protecting element, constituting the means through which the latter may be unscrewed from its position in the coupling.

Fig. 3 is a view similar to Fig. 1, showing a modification in the construction of the rib or bar at the bottom of the thread protector, and formed as an attached element.

Fig. 4 is a fragmentary view in transverse section on the line 4—4, Fig. 3.

In the drawings, the numeral 10 indicates a tubular pipe coupling of approved form and of large diameter, with openings tapering from each end, threaded interiorly as at 11, and counter-bored at its ends, as at 12, to form clearances, as is usual in such constructions.

It is highly desirable to protect the interior threads of the coupling from the time of its manufacture until it is ready for use. Unless such protection be extended the coupling, the threads thereof are liable to become damaged through various destructive agencies reaching the same, principal of which are the entrance of moisture, dirt, grit, and other substances injurious thereto.

To meet this situation and overcome the objection, I have devised the form of thread protector shown, it being constituted as a metal shell, having a flat bottom 13, with an upturned, perforated, side wall 14, the rim of which is provided with an outwardly extending circular flange 15. The diameter of the shell approximates the inside diameter of the coupling at its threaded ends, and its walls taper in correspondence with the threaded openings of the coupling. The shell is easily inserted in the ends of the coupling, with the flange 15 resting against the circular seat formed by the bottom of the counter-bore 12, in the end of the coupling. The contact of the flange with the coupling determines the extent to which the shell can enter the open end of the couplings.

When the parts are so positioned, soft metal plugs 16 may be driven through perforations 17 in the wall of the shell, and expanded into engagement with the threads of the coupling, readily assuming the contour of the latter without injury thereto, whereby the shell is secured in position and provided with threads complemental to those of the coupling. The perforations 17 may be slightly flared toward the inside of the shell, so as to permit expansion of the soft metal plugs therein, and prevent accidental displacement of the latter. The means thus described act effectively to hold the shells in thread protecting positions in both ends of the coupling.

In removing the latter from the coupling, when it is desired to make use of the same, the thread protectors are simply unscrewed and withdrawn. In order to facilitate such unscrewing and withdrawing operation, I provide the bottom of the shell with an upstanding bar 18, which may be formed by displacement of the metal in the bottom of the shell, as in Figs. 1 and 2, or by spot welding thereto a strip 19, as in Figs. 3 and 4, to permit the application of a spanner wrench or other device. Or, wrench sockets may be formed in the bottom of the shell by a reverse displacement of the metal, and a key be used to remove the shell.

When removed from the coupling, the thread protector may be restored to condition for re-use by simply punching out the soft metal plugs or fillers lodged in the perforations 17.

Having thus described my invention, what I desire to obtain by Letters Patent of the United States is:

1. A thread protector for closing the end of an internally threaded tubular article comprising an annular shell adapted to be entirely inserted within the end of the article and to shield the internal threads thereof, and soft metal plugs inserted through perforations in said shell and adapted to engage a portion of the treads to retain said shell in position within the article.

2. A thread protector for closing the end of an internally threaded tubular article comprising an annular shell adapted to be entirely inserted within the end of the article and having a flange at one end adapted to seat on the end thread of the article and a closure at its other end, soft metal plugs for detachably fastening said shell in position, and means to facilitate the removal of said shell from the article.

3. A protector for the internal threads of a pipe coupling comprising a perforated shell having its inner end closed, having an open end provided with an outwardly flaring flange of a lesser diameter than the greatest inside diameter of the coupling to be protected and adapted to seat in the end of the coupling, and having means in said perforations for engaging the threads of the coupling.

4. A protector for the internal threads of a pipe coupling comprising a perforated shell having a closed inner end, an open outer end provided with an outwardly flaring flange of a diameter slightly less than the inside diameter of the end of the coupling to be protected, and having soft metal plugs in said perforations adapted to be driven into engagement with the threads of the coupling.

5. A protector for the internal threads of a pipe coupling comprising a perforated shell having a closed inner end, an open outer end provided with an outwardly flaring flange of a diameter slightly less than the inside diameter of the end of the coupling to be protected, having soft metal plugs in said perforations adapted to be driven into engagement with the threads of the coupling, and means on the closed end to facilitate the removal of the protector from the coupling.

6. In an internally threaded pipe coupling, a thread protector entirely within said coupling comprising a perforated metal shell having a closed end, an open end, having an outwardly flaring flange at the open end seated against the end thread of the coupling, and having soft metal plugs in the perforations in engagement with the threads of the coupling.

In testimony whereof, I have signed my name at Milwaukee, Wisconsin, this 7th day of September, 1927.

HOWARD J. BURNISH.